United States Patent [19]

Burzminski

[11] Patent Number: 4,506,067

[45] Date of Patent: Mar. 19, 1985

[54] DETECTING STOICHIOMETRIC END POINT IN AROMATIC POLYCARBONATE RESIN PREPARATION

[75] Inventor: Michael J. Burzminski, Evansville, Ind.

[73] Assignee: General Electric Company, Mt. Vernon, Ind.

[21] Appl. No.: 539,162

[22] Filed: Oct. 5, 1983

[51] Int. Cl.³ ............................................. C08G 63/62
[52] U.S. Cl. ..................................... 528/196; 526/59; 526/60
[58] Field of Search ..................... 528/196; 526/59, 60

[56] References Cited

U.S. PATENT DOCUMENTS 4,378,454  3/1983  Dick et al. ............................ 526/60

Primary Examiner—Harold D. Anderson
Attorney, Agent, or Firm—Martin B. Barancik

[57] ABSTRACT

A method for detecting the stoichiometric end point of a preparation of aromatic polycarbonate resin involving the use of phosgene and an organic solvent in which the phosgene is normally soluble which comprises detecting the increase of phosgene gas occurring in the vapor phase of the reactor at or following achievement of the stoichiometric end point of the aromatic polycarbonate preparation.

14 Claims, No Drawings

DETECTING STOICHIOMETRIC END POINT IN AROMATIC POLYCARBONATE RESIN PREPARATION

BACKGROUND OF THE INVENTION

The preparation of aromatic polycarbonates by various processes is well known. Until recently, however, when using phosgene to provide the carbonate linkage, a substantial excess of the calculated stoichiometric amount was added to the reactor vessel to insure that a polycarbonate of the appropriate degree of polymerization was actually prepared.

U.S. Pat. No. 4,378,454 issued Mar. 29, 1983, discloses a method for determining the end point of the polycarbonate polymerization reaction. This method is based on the known solubility of phosgene in the same liquid that polycarbonate resin is soluble. Phosgene is essentially instantaneously soluble in solvents such as halogenated organics, e.g., methylene chloride and the like. Once solubilized the phosgene reacts with the bisphenol or active bisphenol derivative, for example sodium bisphenate. Since there is insufficient bisphenol or active bisphenol derivative to react with the phosgene solubilized in the organic solvent, once the stoichiometric end point has been reached, the additional solubilized phosgene can now be detected by the known phosgene color test described in U.S. Pat. No. 4,378,454.

It has now been discovered that at or slightly after the time the stoichiometric end point of the aromatic polycarbonate preparation has been reached, a substantial increase in phosgene concentration in the overhead portion of the reactor, that is, the vapor phase, also occurs. This increase in phosgene concentration can be detected by any standard means and signals the end point of the polymerization reaction. Phosgene addition can then be terminated, thereby saving the extra phosgene which would have been added to insure the achievement of the polymerization end point. Reducing the amount of phosgene also reduces the amount of time for each polymerization, whether batch or continuous, thus increasing the effective capacity of present plant equipment.

DESCRIPTION OF THE INVENTION

In accordance with the invention there is a method for detecting the stoichiometric end point of a preparation of aromatic polycarbonate resin involving the use of phosgene and an organic solvent in which the phosgene is normally soluble which comprises detecting the increase of phosgene gas occurring in the vapor phase of the reactor at or following achievement of the stoichiometric end point of the aromatic polycarbonate preparation.

Any process which prepares an aromatic polycarbonate and which utilizes an organic solvent in which phosgene gas is normally soluble can be employed in this invention. Examples of such processes include a solution process such as pyridine alone or pyridine with an additional organic solvent, usually halogenated and an interfacial polymerization process wherein the actual polymerization occurs at the interface between two substantially insoluble liquids, a water phase containing bisphenol and/or salt of the bisphenol and an organic phase containing the phosgene and the polymerized aromatic polycarbonate resin. These well known reactions are carried out under the standard conditions normally applicable. Generally, the organic solvent which solubilizes the phosgene also solubilizes the aromatic polycarbonate resin as it is formed. The type and quantity of solvent employed usually solubilizes all the aromatic polycarbonate resin, however, significant quantities of resin may be insoluble in the solvent. Extra quantities of organic solvent can be used but in general are unnecessary and merely add to the cost of carrying out the process. Quantities of solvent up to double the minimum amount needed to solubilize the resin can be employed.

Organic solvents which can be employed include the halogenated organics such as methylene chloride, chloroform, carbon tetrachloride, trichloroethylene, ethylene dichloride, chlorobenzene and the like, hydrocarbon solvents including benzene, toluene and the like as well as heteratom containing solvents such as pyridine, lutidine, dimethyl sulfoxide, tetrahydrofuran, dioxane, dimethylformanide, nitrobenzene and the like.

The interfacial polymerization process is preferred. Methylene chloride is the preferred solvent.

The dihydric aromatic compounds employed in the practice of this invention are known dihydric aromatic compounds in which the sole reactive groups are the two phenolic hydroxyl groups. Some of these are represented by the general formula

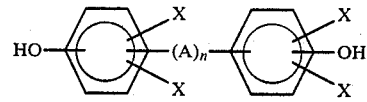

wherein A is a divalent hydrocarbon radical containing 1–15 carbon atoms, or

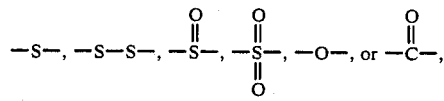

X is independently hydrogen, chlorine, bromine, fluorine, or a monovalent hydrocarbon radical such as an alkyl group of 1–4 carbons, an aryl group of 6–8 carbons such as phenyl, tolyl, xylyl, an oxyalkyl group of 1–4 carbons or an oxyaryl group of 6–8 carbons and n is 0 or 1.

One group of suitable dihydric aromatic compounds are those illustrated below:

1,1-bis(4-hydroxylphenyl)-1-phenyl ethane
1,1-bis-(4-hydroxyphenyl)-1,1-diphenyl methane
1,1-bis(4-hydroxyphenyl)cyclooctane
1,1-bis(4-hydroxyphenyl)cycloheptane
1,1-bis(4-hydroxyphenyl)cyclohexane
1,1-bis(4-hydroxyphenyl)cyclopentane
2,2-bis(3-propyl-4-hydroxyphenyl)decane
2,2-bis(3,5-dibromo-4-hydroxyphenyl)nonane
2,2-bis(3,5-isopropyl-4-hydroxyphenyl)nonane
2,2-bis(3-ethyl-4-hydroxyphenyl)octane
4,4-bis(4-hydroxyphenyl)heptane
3,3-bis(3-methyl-4-hydroxyphenyl)hexane
3,3-bis(3,5-dibromo-4-hydroxyphenyl)hexane
2,2-bis(3,5-difluoro-4-hydroxyphenyl)butane
2,2-bis(4-hydroxyphenyl)propane(Bisphenol A)
1,1-bis(3-methyl-4-hydroxyphenyl)ethane
1,1-bis(4-hydroxyphenyl)methane.

Another group of dihydric aromatic compounds useful in the practice of the present invention include the dihydroxyl diphenyl sulfoxides such as for example:
bis(3,5-diisopropyl-4-hydroxyphenyl)sulfoxide
bis(3-methyl-5-ethyl-4-hydroxyphenyl)sulfoxide
bis(3,5-dibromo-4-hydroxyphenyl)sulfoxide
bis(3,5-dimethyl-4-hydroxyphenyl)sulfoxide
bis(3-methyl-4-hydroxyphenyl)sulfoxide
bis(4-hydroxyphenyl)sulfoxide Another group of dihydric aromatic compounds which may be used in the practice of the invention includes the dihydroxyaryl sulfones such as, for example:
bis(3,5-diisopropyl-4-hydroxyphenyl)sulfone
bis(3,5-methyl-5-ethyl-4-hydroxyphenyl)sulfone
bis(3-chloro-4-hydroxyphenyl)sulfone
bis(3,5-dibromo-4-hydroxyphenyl)sulfone
bis(3,5-dimethyl-4-hydroxyphenyl)sulfone
bis(3-methyl-4-hydroxyphenyl)sulfone
bis(4-hydroxyphenyl)sulfone.

Another group of dihydric aromatic compounds useful in the practice of the invention includes the dihydroxydiphenyls:
3,3',5,5'-tetrabromo-4,4'-dihydroxydiphenyl
3,3'-dichloro-4,4'-dihydroxydiphenyl
3,3'-diethyl-4,4'-dihydroxydiphenyl
3,3'-dimethyl-4,4'-dihydroxydiphenyl
p,p'-dihydroxydiphenyl.

Another group of dihydric aromatic compounds which may be used in the practice of the invention includes the dihydric phenol ethers:
bis(3-chloro-5-methyl-4-hydroxyphenyl)ether
bis(3,5-dibromo-4-hydroxyphenyl)ether
bis(3,5-dichloro-4-hydroxyphenyl)ether
bis(3-ethyl-4-hydroxyphenyl)ether
bis(3-methyl-4-hydroxyphenyl)ether it is, of course, possible to employ a mixture of two or more different dihydric aromatic compounds or a mixture of a dihydric aromatic compound and an aliphatic diol in preparing the thermoplastic carbonate polymers of the invention.

It is possible to employ two or more different dihydric phenols or a copolymer of a dihydric phenol with a glycol or with a hydroxy or acid terminated polyester or with a dibasic acid in the event a carbonate copolymer or interpolymer rather than a homopolymer is desired for use in the preparation of the polycarbonate mixtures of the invention. Branched polycarbonates are also useful, such as are described in U.S. Pat. No. 4,001,184.

Copolyestercarbonates as defined in U.S. Pat. No. 3,169,121, incorporated by reference, and ensuing cases are also part of this invention under the general term polycarbonates. Suitable processes for which this invention would be applicable are those involving the use of phosgene to achieve the final copolyestercarbonate resin, as for example U.S. Pat. No. 4,238,597 and U.S. Pat. No. 4,238,596. A polycarbonate for the purposes of this invention is any polymer having carbonate groups prepared from the use of phosgene, the phosgene being present at the end point of the reaction. An aromatic polycarbonate has at least some of the carbonate groups attached to an aromatic nucleus.

The temperature at which the polymerization is run is not unduly significant. Temperatures from about 15° C. to the reflux temperature of the solvent system can be employed with facility.

The method used for detecting the phosgene in the vapor, gaseous state can be any test system which shows a difference in phosgene concentration over a time interval. Such tests include the direct assaying of the gaseous vapors themselves or indirect assaying by reacting the vapors with another substance to provide a product whose concentration can be readily detected and reflects the change of concentration of phosgene in the vapors.

A method for directly assaying the phosgene gas in the overhead is through the use of infra red spectroscopy for the characteristic band at 850 cm$^{-1}$. The quantity of phosgene is directly related to the strength of the band.

Methods for indirectly assaying the phosgene is by passage of the overhead phosgene through water and then measuring the resulting pH or conductivity of the solution. Phosgene reacts with water to produce hydrochloric acid and carbon dioxide according to the following equation.

$$COCl_2 + H_2O \rightarrow 2HCl + CO_2$$

The change in acidity of the water solution can be monitored with a pH meter. The change in the ionic strength can be monitored with conductivity probes. When monitoring acidity a sharp break in pH occurs around the stoichiometric end point of the polymerization reaction. A decrease of about 2+ pH units occurs in approximately two minutes.

Throughout the specification, the invention has been described in the terms of extra gaseous phosgene at polymerization stoichiometric end point or soon thereafter. Other gases may also be present in the overhead, for example carbon dioxide, hydrochloric acid and methylene chloride. These gases could account for at least some of the observed changes. However, without being held to any particular scientific theory explaining the observed results, it is presently thought that phosgene is the major constituent of the overhead gas and that it accounts for at least a preponderance of the observed changes.

Following are specific examples of the invention. These examples are intended to exemplify rather than restrict the generic nature of the invention.

The following experimental apparatus was employed in all the examples.

A five liter water jacketed baffled glass reactor was employed. It was fitted with an agitator and several inlets, one for the addition of sodium hydroxide solution and the second for the addition of phosgene. A spigot at the bottom could be opened for withdrawal of reactor contents. Attached to the reactor was a condenser tube for the condensation of vapors, if possible. A line from the condensation tube took noncondensed vapors to a vented vessel containing a fixed amount of water, the vessel having a constant flow of water entering and exiting therefrom. A pH meter monitored the acidity of the water in the closed vessel. This closed vessel served as a water trap for the phosgene leaving the reactor as gas. Hydrochloric acid is produced from the reaction of the phosgene with the water and the acidity recorded by the pH meter.

EXAMPLE 1

To the five gallon reactor described above was charged:

432 g 2,2 bis(4-hydroxyphenyl)propane [bisphenol A]
1.895 moles
1032 g H$_2$O
1494 g methylene chloride
1.91 g triethylamine (1.0 mole % of bisphenol A)
4.45 g phenol (2.5 mole % of bisphenol A)
0.60 g gluconic acid Phosgene was now added at a rate of 6.88 g/minute (0.0367 moles phosgene/moles bisphenol A/minute). During the reaction the pH was maintained at about 11–11.2 through the addition of 50% NaOH. Phosgene addition was maintained for thirty minutes. At specific time intervals from the initial addition of the phosgene, the pH of the water into which the gaseous overhead was flowing was monitored. Concurrently, samples of the reaction vessel contents were taken and the polymerization reaction followed by measuring the intrinsic viscosity (I.V.) of the aromatic polycarbonate at 25° C. in methylene chloride.

Below are the results:

| TIME* | pH | I.V. |
|---|---|---|
| Run I | | |
| 10 | 5.25 | — |
| 15 | 5.25 | — |
| 20 | 5.25 | — |
| 24 | 5.25 | .227 |
| 25 | 5.20 | .473 |
| 26 | 3.90 | .561 |
| 27 | 2.35 | .562 |
| 28 | 2.25 | .578 |
| 30 | 2.25 | .637 |
| Run II | | |
| 20 | 5.35 | — |
| 24 | 5.35 | .238 |
| 25 | 5.35 | .382 |
| 26 | 5.35 | .450 |
| 27 | 4.70 | .452 |
| 28 | 2.80 | .463 |
| 30 | 2.70 | .479 |
| Run III | | |
| 20 | 5.35 | — |
| 24 | 5.35 | .185 |
| 25 | 5.35 | .306 |
| 26 | 5.35 | .372 |
| 27 | 4.50 | .434 |
| 28 | 2.80 | .457 |
| 30 | 2.70 | .471 |

*minutes after initial addition of phosgene

The sudden decrease in pH corresponds to the rapid buildup in the I.V. As the pH plateaus at the low figure after its sudden decrease, the I.V. also plateaus at an approximately high degree of polymerization thus indicating the preparation of "high" polymeric resin. The pH stays virtually the same until the degree of polymerization starts building up substantially. This pH value until that time is the same as the pH of the water in the trap indicating that no phosgene gas is coming through in the overhead. The decrease in pH shows the presence of phosgene in the overhead. The pH drops sharply in a very small interval period—a matter of approximately 2.5 pH units in a span of about 2 minutes. The addition of phosgene can be stopped anywhere along the steep pH drop and high aromatic polycarbonate resin at or near the stoichiometric end point of the reaction can be isolated. Thus an accurate, easily measured and inexpensive means of detecting the end point of the polymerization reaction has been achieved.

What is claimed is:

1. A method for detecting the stoichiometric end point of a preparation of aromatic polycarbonate resin from at least one dihydric phenol, phosgene and an organic solvent in which the phosgene is normally soluble in a reactor comprising a vapor phase portion which comprises detecting the increase of phosgene gas occurring in the vapor phase portion of the reactor at or shortly after achievement of the stoichiometric end point of the aromatic polycarbonate preparation.

2. A method in accordance with claim 1 wherein the increase in phosgene gas is measured directly.

3. A method in accordance with claim 1 wherein the increase in phosgene is measured indirectly.

4. A method in accordance with claim 1 wherein the aromatic polycarbonate resin is prepared by a solvent process.

5. A method in accordance with claim 1 wherein the aromatic polycarbonate resin is prepared by an interfacial polymerization process.

6. A method in accordance with claim 5 wherein the organic solvent is a halogenated hydrocarbon.

7. A method in accordance with claim 6 wherein the halogenated hydrocarbon is methylene chloride.

8. A method in accordance with claim 7 wherein the aromatic polycarbonate resin is at least essentially completely soluble in the methylene chloride.

9. A method in accordance with claim 1 wherein the aromatic polycarbonate resin is derived from a dihydric phenol and phosgene.

10. A method in accordance with claim 9 wherein the dihydric phenol is bisphenol A.

11. A method in accordance with claim 10 wherein the increase in phosgene is measured indirectly.

12. A method in accordance with claim 3 wherein phosgene gas of the vapor phase is reacted with water and the pH of the water measured.

13. A method in accordance with claim 3 wherein the aromatic polycarbonate resin is prepared in an interfacial polymerization process from bisphenol A and phosgene.

14. A method in accordance with claim 13 wherein the phosgene gas of the vapor phase is reacted with water and the pH of the water measured.

* * * * *